June 6, 1961 L. A. BROOKS 2,987,141
DUAL WHEEL CASTER LOCK
Filed March 30, 1959 2 Sheets-Sheet 1
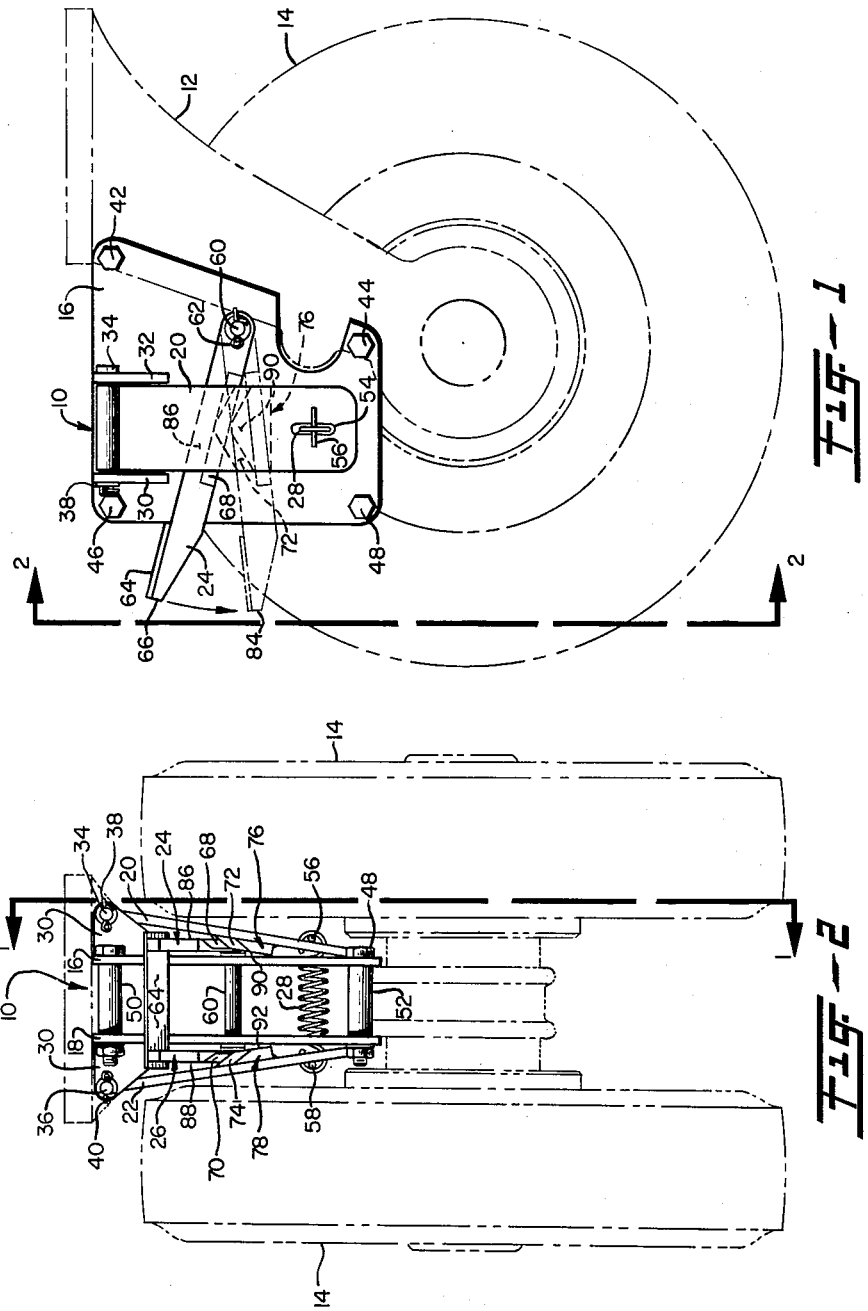
INVENTOR.
LLOYD A. BROOKS
BY
D. Gordon Angus
ATTORNEY June 6, 1961   L. A. BROOKS   2,987,141
DUAL WHEEL CASTER LOCK
Filed March 30, 1959   2 Sheets-Sheet 2

INVENTOR.
LLOYD A. BROOKS
BY
ATTORNEY

United States Patent Office 2,987,141
Patented June 6, 1961

2,987,141
DUAL WHEEL CASTER LOCK
Lloyd A. Brooks, Ontario, Calif., assignor to Aerojet-General Corporation, Azusa, Calif., a corporation of Ohio
Filed Mar. 30, 1959, Ser. No. 802,991
5 Claims. (Cl. 188—2)

This invention relates generally to wheel locks and particularly to dual wheel caster locks.

A principal object of the present invention is to provide a novel method of and improved means for locking the wheels of a dual wheel assembly.

Another object of the invention is to provide a wheel lock which may be actuated by the operator's foot.

A further object of the present invention is the provision of a wheel lock which will not add dimensionally to the overall width of the dual wheel assembly.

A still further object of this invention is the provision of a dual wheel lock which will be substantially protected from any damaging bumps or impacts which it otherwise may incur.

In its principal aspect, the present invention comprises a wheel lock for use with a dual wheel assembly which may be mounted on the rib and between the wheels of said assembly. Although the following describes the present invention as embodies in a dual wheel caster assembly, it is to be understood that this locking device is adaptable to any dual wheel assembly and its use is not restricted to assemblies of the caster type. A pair of pivotally mounted lever arms, which when moved downwardly, by wedging action, causes a pair of locking plates to move outwardly to bear against the inner surface of the wheels and friction locks them from further movement. An upward movement may be imparted to the lever arms to disengage the locking plates from the wheels and free the wheel assembly for further movement.

These and other objects, aspects, features, and advantages of the present invention will be apparent to those skilled in the art from the following more detailed description taken in conjunction with the appended drawings wherein:

FIG. 1 is a side elevation of a wheel lock for dual wheel casters embodying the present invention, taken on line 1—1 of FIGURE 2;

FIGURE 2 is a rear elevation of the same wheel lock, taken on line 2—2 of FIGURE 1, and which shows the wheel lock in the unlocked position.

Figure 3:
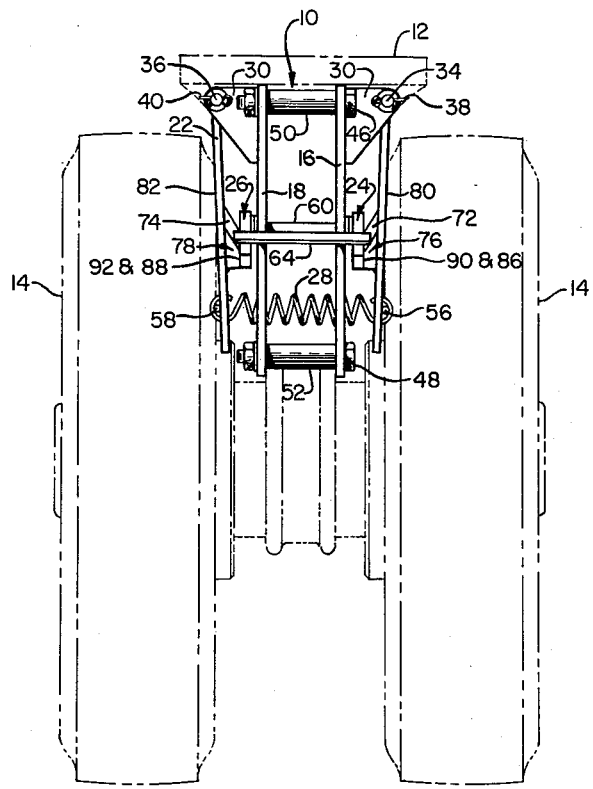
FIGURE 3 is a rear elevation view showing the wheel lock of FIGS. 1 and 2 in the locked position.

Referring now to FIG. 1, which is an elevation view taken along line 1—1 of FIG. 2, the numeral 10 indicates in general the locking device of this invention. The rib 12 and wheels 14 of a dual wheel type caster are shown in phantom line in all the drawings since the caster constitutes no part of this invention.

The wheel lock 10 consists of four major parts; the side plates 16, 18; locking plates 20, 22; first and second lever arms 24, 26; and a tension spring 28. Two locking plate supports 30, 32 are affixed as by welding, to each of the side plates 16, 18 which support locking plates 20, 22 by the use of pins 34, 36. Pins 34, 36 are retained in place by a washer and cotter pin sets 38, 40.

Side plates 16, 18 are bolted to the rib 12 of the caster by bolts 42, 44 and held parallel to each other by other bolts 46, 48 with spacers 50, 52, between side plates 16, 18 as shown in FIG. 2.

As seen in FIGS. 1 and 2, the lower ends of locking plates 20, 22, are made to bear against the side plates 16, 18 by a tension spring 28. The spring 28 passes through holes (not shown) in the side plates 16, 18 and through slots 54 in the locking plates 20, 22 and is retained in said slots by the pins 56, 58.

The two lever arms 24, 26 are pivotally mounted on the ends of a pin 60 which in turn is supported in a pair of holes (not shown) in the side plates 16, 18. The pin 60 is retained in position by a washer and cotter pin set 62. The first lever arm 24 is arranged between the side plate 16 and the locking plate 20, while the second lever arm 26 is arranged between a side plate 18 and the locking plate 22, as may be seen in FIGS. 2 and 3. A pedal plate 64 connects to both the lever arms 24, 26. Thus any movement of the pedal plate 64 results in simultaneous movement of both the lever arms 24, 26.

As may be seen in FIGS. 1 and 2, when the lever arms 24, 26 are in the full-raised position, indicated at 66, the locking plates 20, 22 (FIG. 2) are made to bear against the side plates 16, 18 as previously described. However, as the lever arms 24, 26 are moved downward by the placement of the weight of the operator on the pedal plate 64 with his foot, the beveled surfaces 68, 70 of the lever arms 24, 26 engage the wedge-shaped beveled surfaces 72, 74 of the bevel plates 76, 78 which are secured to the inside of the locking plates 20, 22. The relative movement of the beveled surfaces 68, 70 of the lever arms 24, 26 against the beveled surfaces 72, 74 of the bevel plates 76, 78 results in an outward movement of the locking plates 20, 22 causing them to pivot on pins 34 and 36. This stretches spring 28, putting it in tension.

Referring now to FIG. 3, which shows the device in the locked position, as the locking plates 20, 22 pivot outwardly on pins 34, 36, they engage and bind against the inside of the wheels 14 of the caster at 80 and 82. When the operator has depressed the pedal plate 64 to the position indicated at 84 in FIG. 1, the flat surfaces 86, 88 of the lever arms 24, 26 engage the flat surfaces 90, 92 of the bevel plates 76, 78. When these flat surfaces are engaged, the lever arms 24, 26 are in the full locked position 84 (FIG. 1) and will not permit the locking plates 20, 22 to be snapped back from engagement with the tires 14 by the spring 28. To unlock the locking device 10, the operator need only raise the pedal plate 64 until the beveled surfaces 68, 70 of the lever arms 24, 26 and beveled surfaces 72, 74 of bevel plates 76, 78 engage. The tension action of spring 28 will disengage the locking plates 20, 22 from the wheels 14 and simultaneously return the lever arms 24, 26 to the full unlocked position 66 with a snap action. The caster is now free to rotate, and movement of the vehicle to which it is mounted is unrestricted.

It is to be understood that the form of the invention herewith shown and described is to be taken as a preferred example of the same, and that various changes in the shape, size and arrangement of the parts may be resorted to, without departing from the spirit of this invention, or the scope of the claims.

What is claimed is:

1. In a wheel lock adapted for use with a dual wheel assembly, the combination comprising: means for support, means for wheel locking pivotally mounted on said support means, wedge means mounted upon said locking means, lever means capable of arcuate movement pivotally mounted on said support means, said lever means being arranged to engage said wedge means during a position of said arcuate movement to cause said locking means to bear in rotation preventing engagement with the wheels of the assembly, said locking means arranged to move in a plane perpendicular to the movement of said lever, and tension means for retracting said locking means from engagement with the wheels when said lever means are in non-engagement with said wedge means.

2. A lock for a dual wheel assembly comprising: a pair of spaced plate members, a pair of lever arms pivotally mounted on said spaced plate members, said lever arms having beveled surfaces intermediate their length, a pair of locking plates pivotally mounted on said spaced plates and arranged to move in a plane perpendicular to the plane of movement of said lever arms, wedge plates mounted on each of said locking plates and arranged to slidably engage the beveled surfaces of said lever arms during a portion of the arcuate movement of said lever arms, the resulting movement of said wedge plates moving said locking plates into friction locking engagement with the wheels of said assembly, and a spring arranged in tension engagement with said locking plates to remove said plates from engagement with said wheels when said lever arms are in non-engagement with said wedge plates.

3. An operator-actuated lock for a dual wheel assembly comprising: a pair of spaced support plates, a pair of joined lever arms pivotally mounted on said support plates for arcuate movement with relation to said spaced support plates, said lever arms having beveled surfaces intermediate their length and being adapted for actuation in response to an impulse imparted from the pedal extremities of an operator, pin means arranged within said support plates, a pair of locking plates pivotally mounted on said pin means and arranged to move in a plane perpendicular to the plane of movement of said lever arms and adapted to frictionally engage the wheels of the assembly in braking relationship, a wedge plate mounted on each of said locking plates and arranged to slidably engage the beveled surface of a lever arm during a segmental portion of the arcuate movement, and resilient means mounted on said support plates and engaging said locking plates, whereby the movement of said wedge plates resulting from engagement with said lever arms moves the locking plates into frictional locking engagement with the wheels of said assembly, and the resilient means is operative to remove said locking plates from engagement with the wheels when said lever arms are in non-engagement with said wedge plates.

4. A device as in claim 3 wherein said wheel lock is arranged between the wheels of a dual wheel caster assembly.

5. In combination: a dual wheel caster assembly, a locking device arranged between the wheels of said assembly comprising, a pair of spaced support plates, first pin means arranged within said support plates, a pair of lever arms pivotally mounted on said first pin means for synchronous arcuate movement with relation to said space support plates, said lever arms having beveled surfaces intermediate their length, second pin means arranged within said support plates, a pair of locking plates pivotally mounted on said second pin means and arranged to move in a plane perpendicular to the plane of movement of said lever arms and adapted to frictionally engage the wheels of the assembly in braking relationship, a wedge plate mounted on each of said locking plates and arranged to slidably engage the beveled surface of a lever arm during a segmental portion of the arcuate movement, and resilient means mounted on said support plates and engaging said locking plates, whereby the movement of said wedge plates resulting from engagement with said lever arms moves the locking plates into frictional locking engagement with the wheels of said assembly, and the resilient means is operative to remove said locking plates from engagement with the wheels when said lever arms are in non-engagement with said wedge plates.

References Cited in the file of this patent

UNITED STATES PATENTS

| 2,878,899 | Kramcsak | Mar. 24, 1959 |
| 2,900,657 | Snell | Aug. 25, 1959 |

FOREIGN PATENTS

| 120,413 | Great Britain | Nov. 14, 1918 |